(12) United States Patent
Gao et al.

(10) Patent No.: US 8,396,295 B2
(45) Date of Patent: Mar. 12, 2013

(54) METHOD AND SYSTEM FOR RECOGNIZING A HANDWRITTEN CHARACTER

(75) Inventors: Jing-lian Gao, Guanghzou (CN);
Xinchun Huang, Guangzhou (CN);
Binghui Chen, Guangzhou (CN); Anjin Hu, Guangzhou (CN); Muyu Cai, Guangzhou (CN); Huaxing Lu, Guangzhou (CN); Zhipin Liu, Guangzhou (CN); Zhiai Wang, Guangzhou (CN); Fang Guo, Guangzhou (CN); Jingping Li, Guangzhou (CN); Honghui Wang, Guangzhou (CN); Chuntao Tan, Guangzhou (CN); Zhengwei Wu, Guangzhou (CN)

(73) Assignee: Guangdong Guobi Technology Co., Ltd, Guangzhou (CN)

( * ) Notice: Subject to any disclaimer, the term of this patent is extended or adjusted under 35 U.S.C. 154(b) by 137 days.

(21) Appl. No.: 13/142,856

(22) PCT Filed: Feb. 25, 2009

(86) PCT No.: PCT/CN2009/000203
§ 371 (c)(1),
(2), (4) Date: Jun. 30, 2011

(87) PCT Pub. No.: WO2010/078698
PCT Pub. Date: Jul. 15, 2010

(65) Prior Publication Data
US 2011/0311141 A1 Dec. 22, 2011

(30) Foreign Application Priority Data

Dec. 30, 2008 (CN) .......................... 2008 1 0220605

(51) Int. Cl.
*G06K 9/00* (2006.01)
(52) U.S. Cl. ...................................................... 382/187
(58) Field of Classification Search .................. 382/181, 382/185–190, 224, 254, 258, 276
See application file for complete search history.

(56) References Cited

U.S. PATENT DOCUMENTS 7,593,574 B2 * 9/2009 Simard et al. ................. 382/186
8,219,908 B2 * 7/2012 Napper et al. ................ 715/268

* cited by examiner

*Primary Examiner* — Daniel Mariam
(74) *Attorney, Agent, or Firm* — George D. Liu; Ronda IP Agent Co., Ltd

(57) ABSTRACT

The present invention discloses a method for recognizing a handwritten character, which includes the following steps of: obtaining a coarse classification template and a fine classification template; receiving a handwritten character input signal from a user, gathering a discrete coordinate sequence of trajectory points of the inputted character, and pre-processing the discrete coordinate sequence; extracting eigenvalues and calculating a multi-dimensional eigenvector of the inputted character; matching the inputted character with the coarse classification template to select a plurality of the most similar candidate character classes; and matching the eigen-transformed inputted character with sample centers of the candidate character classes selected from the fine classification template, and determining the most similar character classes among the candidate character classes. The present invention further discloses a system for recognizing a handwritten character. The present invention can recognize an inputted character fast at a high recognition precision.

12 Claims, 5 Drawing Sheets

 
Fig.5a  Fig.5b
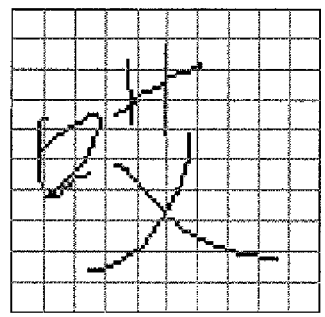
Fig.6
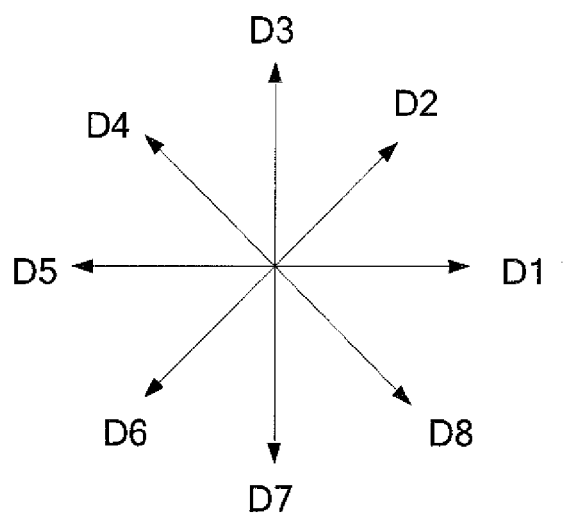
Fig.7

METHOD AND SYSTEM FOR RECOGNIZING A HANDWRITTEN CHARACTER

TECHNICAL FIELD

The present invention relates to the field of handwritten character recognition, and more particularly, to a method and a system for recognizing a handwritten character.

DESCRIPTION OF RELATED ART

Currently, the technologies of handwritten input recognition have been applied to various communication terminals and information processing terminals. This type of terminal product usually has a touch handwriting fluorescent screen for writing. A user can write a word on the screen by a pen or a finger thereof, and the word is then recognized and processed by the terminal to generate a corresponding character for display on the terminal and to perform subsequent related operations. The technologies of handwritten input recognition improve the input speed and flexibility, so they have been widely used.

Currently, the process of handwritten input recognition is mostly divided into such steps as signal acquisition, pre-processing, eigenvalue extraction and eigenvalue matching. The shortcomings of massive calculations and a long processing duration in the prior art result in a slow recognizing speed and a low recognition precision, so further improvement must be made in the prior art.

BRIEF SUMMARY OF THE INVENTION

In view of the shortcomings in the prior art, a technical problem to be solved by embodiments of the present invention is to provide a method and a system for recognizing a handwritten character so as to increase the speed and the precision of eigenvalue extraction in handwritten character input recognition.

The objective of the present invention is achieved by the following technical solution: a method for recognizing a handwritten character, including the following steps of:

A. creating a coarse classification template composed of first sample centers of character classes and a fine classification template composed of second sample centers of the character classes, wherein the fine classification template is obtained by using an eigen transformation matrix to perform eigen transformation on samples of the character classes;

B. receiving a handwritten character input signal from a user and gathering a discrete coordinate sequence of trajectory points of an inputted character corresponding to the handwritten character input signal, and pre-processing the discrete coordinate sequence to obtain a normalized coordinate sequence of the inputted character;

C. extracting eigenvalues according to the normalized coordinate sequence and decomposing vector line sections formed by all adjacent trajectory points into eight standard directions to calculate a multi-dimensional eigenvector of the inputted character;

D. selecting a part of the eigenvalues from the multi-dimensional eigenvector of the inputted character, matching the inputted character with the coarse classification template to select a plurality of the most similar sample centers from the coarse classification template, and using character classes corresponding to the plurality of sample centers as candidate character classes; and E. using the eigen transformation matrix in the step A to perform eigen transformation on the multi-dimensional eigenvector of the inputted character, selecting sample centers of the candidate character classes obtained in the step D from the fine classification template for matching with the eigen-transformed inputted character respectively, and determining the most similar character classes among the candidate character classes for the user to select.

The present invention further provides a system for recognizing a handwritten character, which includes:

a storage module, being configured to store character classes, a coarse classification template and a fine classification template corresponding to the character classes, and an eigen transformation matrix calculated according to the Fisher criteria;

a first signal gathering module, being configured to receive a handwritten character input signal from a user and gather a discrete coordinate sequence of trajectory points of the handwritten character;

a first normalizing module, being configured to transform the discrete coordinate sequence of the trajectory points of the handwritten character that is gathered by the first signal gathering module into another discrete coordinate sequence so as to adjust the size, the shape and coordinate values of a center of gravity of the handwritten character to obtain a normalized coordinate sequence of the character;

a first eigenvalue extracting module, being configured to, according to the normalized coordinate sequence, decompose vector line sections formed by all adjacent trajectory points of the handwritten character into eight standard directions to calculate a multi-dimensional eigenvector of the handwritten character;

a coarse classification module, being configured to select a part of eigenvalues from the multi-dimensional eigenvector of the inputted character by the user, match the inputted character with the coarse classification template in the storage module to select a plurality of the most similar sample centers from the coarse classification template, and use character classes corresponding to the plurality of sample centers as candidate character classes;

a fine classification module, being configured to perform eigen transformation on the multi-dimensional eigenvector of the inputted character, select sample centers of the candidate character classes from the fine classification template for matching with the eigen-transformed inputted character respectively, and determine the most similar character classes among the candidate character classes for the user to select; and a display module, being configured to display the most similar character classes outputted by the fine classification module for the user to select.

As compared to the prior art, by decomposing line sections of the stroke trajectory into eight directions directly, the present invention avoids the additional calculations caused by generation of an image and increases the accuracy of the obtained directional eigenvalues so as to achieve an increased recognition accuracy of the character.

In a preferred embodiment of the method for recognizing a handwritten character of the present invention, the step A includes the following sub-steps of:

A1. gathering handwritten character samples of the character classes, and calculating a discrete coordinate sequence of the trajectory points of the handwritten character samples;

A2. pre-processing the discrete coordinate sequence of the trajectory points of the handwritten character samples to obtain a normalized coordinate sequence of the handwritten character samples;

A3. extracting eigenvalues according to the normalized coordinate sequence and decomposing vector line sections formed by all adjacent trajectory points into eight standard directions to obtain a multi-dimensional eigenvector of the handwritten character samples;

A4. selecting a part of the eigenvalues from the multi-dimensional eigenvector of the samples of all the character classes and calculating first sample centers of the character classes to obtain a coarse classification template composed of the first sample centers of the character classes; and A5. calculating an eigen transformation matrix according to the Fisher criteria, performing eigen transformation on the multi-dimensional eigenvector of the samples of all the character classes by using the eigen transformation matrix, and re-calculating second sample centers of the character classes to obtain a fine classification template composed of the second sample centers of the character classes.

In another preferred embodiment of the method for recognizing a handwritten character of the present invention, the sub-step A3 and the step C include the following sub-steps of according to the normalized coordinate sequence, decomposing the vector line sections formed by all the adjacent trajectory points into eight standard directions, and obtaining length values of the vector line sections in each of the standard directions; and processing the obtained length values of the vector line sections, and calculating large-scale eigenvalues and small-scale eigenvalues to obtain a multi-dimensional eigenvector composed of the large-scale eigenvalues and the small-scale eigenvalues.

In a further preferred embodiment of the method for recognizing a handwritten character of the present invention, the sub-step A4 includes the following sub-steps of:

according to the Fisher criteria, selecting a plurality of eigenvalues that can result in the maximum Fisher ratio from samples of each of the pre-stored character classes; and according to the eigenvector of the samples composed of the selected eigenvalues, calculating eigenvectors of the sample centers of the character classes to obtain the coarse classification template composed of the sample centers of all the character classes.

In a further preferred embodiment of the method for recognizing a handwritten character of the present invention, the sub-step A5 includes the following sub-steps of:

performing eigen transformation on the samples of all the character classes by using the eigen transformation matrix obtained according to the Fisher criteria to reduce the dimensionality of the multi-dimensional eigenvector;

re-calculating sample centers of all the character classes that have been eigen-transformed; and performing iterative adjustment on the eigen transformation matrix and the sample centers of all the character classes, and re-calculating the eigen transformation matrix and sample centers of all the character classes to obtain the fine classification template composed of the sample centers of all the character classes.

In a further preferred embodiment of the method for recognizing a handwritten character of the present invention, the step D includes the following sub-steps of:

selecting a part of eigenvalues from the multi-dimensional eigenvector of the inputted character according to the Fisher criteria, wherein the inputted character has an eigenvector composed of the selected eigenvalues and having the same dimensionality as the samples of the character classes; and matching the handwritten input character with the coarse classification template and selecting a plurality of the most similar candidate character classes from the pre-stored character classes.

In a further preferred embodiment of the method for recognizing a handwritten character of the present invention, the step E includes the following sub-steps of performing eigen transformation on the inputted character by using the eigen transformation matrix that has been iteratively adjusted to obtain a low-dimensionality eigenvector; and matching the low-dimensionality eigenvector of the inputted character with the sample centers of the candidate character classes selected from the fine classification template respectively, and determining the most similar character classes among the candidate character classes for the user to select.

In a further preferred embodiment of the method for recognizing a handwritten character of the present invention, the sub-step A1 and the step B further include the following sub-steps of:

determining whether input of a handwritten character is completed, and stopping gathering the discrete coordinate sequence of the character when a time period during which no handwritten character input signal is received exceeds a preset threshold;

determining whether the number of trajectory points of the handwritten character gathered is only one, and if yes, then deleting the trajectory point and re-gathering trajectory points; and detecting a distance between coordinates of adjacent ones of the gathered trajectory points of the handwritten character, and if the distance is smaller than a preset threshold, then deleting one of the trajectory points such that a certain distance is kept between the adjacent trajectory points.

In a further preferred embodiment of the method for recognizing a handwritten character of the present invention, the pre-processing in the sub-step A2 and the step B is to transform the gathered discrete coordinate sequence of the trajectory points of the handwritten character into another discrete coordinate sequence so as to adjust the size, the shape and coordinate values of a center of gravity of the handwritten input character, including the following sub-steps of transforming abscissa values and ordinate values of all the trajectory points to be between 0 and 100;

calculating coordinate values of centers of gravity of the abscissa values and the ordinate values of all the trajectory points respectively;

dividing all the coordinate values of the trajectory points and the coordinates values of the centers of gravity by 100 such that all the coordinate values of the trajectory points and the coordinate values of the centers of gravity are between 0 and 1, and transforming the gathered discrete coordinate sequence of the trajectory points of the handwritten character into another discrete coordinate sequence by using a smooth continuous function that transforms abscissa values and ordinate values of the centers of gravity into 0.5; and multiplying all the coordinate values of the trajectory points by 64 to obtain a normalized coordinate sequence of the input character.

In a preferred embodiment of the system for recognizing a handwritten character of the present invention, the system further includes a matching template gathering sub-system, which includes:

a second signal gathering module, being configured to receive a handwritten character sample signal and gather a discrete coordinate sequence of trajectory points of the handwritten character;

a second normalizing module, being configured to transform the discrete coordinate sequence of the trajectory points of the handwritten character that is gathered by the second signal gathering module into another discrete coordinate sequence so as to adjust the size, the shape and coordinate values of a center of gravity of the handwritten character to obtain a normalized coordinate sequence of the character;

a second eigenvalue extracting module, being configured to, according to the normalized coordinate sequence, decompose vector line sections formed by all adjacent trajectory points of the handwritten character into eight standard directions to calculate a multi-dimensional eigenvector of the handwritten character;

a coarse classification template calculating module, being configured to select a part of eigenvalues from the multi-dimensional eigenvector of the samples of all the character classes that is obtained by the eigenvalue extracting module, calculate sample centers of the character classes to obtain the coarse classification template composed of the sample centers of all the character classes, and store the coarse classification template into the storage module; and a fine classification template calculating module, being configured to calculate the eigen transformation matrix according to the Fisher criteria, perform eigen transformation on the multi-dimensional eigenvector of the samples of all the character classes by using the eigen transformation matrix, re-calculate sample centers of the character classes to obtain the fine classification template composed of the sample centers of all the character classes, and store the fine classification template and the eigen transformation matrix into the storage module.

In another preferred embodiment of the system for recognizing a handwritten character of the present invention, the first signal gathering module and the second signal gathering module further include:

an gathering unit, being configured to receive a handwritten character signal and gather a discrete coordinate sequence of trajectory points of the handwritten character;

a determining unit, being configured to determine whether input of a handwritten character is completed, and stop gathering the discrete coordinate sequence of the character when a time period during which no handwritten character input signal is received exceeds a preset threshold; and a detecting unit, being configured to determine whether the number of trajectory points of the handwritten character gathered is only one, and if yes, delete the trajectory point and re-gather trajectory points; and detect a distance between coordinates of adjacent ones of the gathered trajectory points of the handwritten character, and if the distance is smaller than a preset threshold, delete one of the trajectory points such that a certain distance is kept between the adjacent trajectory points.

BRIEF DESCRIPTION OF THE SEVERAL VIEWS OF THE DRAWINGS

FIG. 5*a* is a schematic view of a character before the size and the shape thereof is adjusted in a step S02 of FIG. 1;

FIG. 5*b* is a schematic view of the character after the size and the shape thereof is adjusted in the step S02 of FIG. 1;

FIG. 6 is a schematic view of the adjusted character after being put into a grid in the step S02 of FIG. 1;

FIG. 7 is a diagram of eight standard directions described in a step S03 of FIG. 1.

DETAILED DESCRIPTION OF THE INVENTION

For ease of understanding the present invention, a further description will be made with reference to the attached drawings. However, embodiments in the attached drawings impose no limitation on the present invention.

According to the present invention, a character inputted by handwriting is subjected to such flow processes as coordinate sequence acquisition, pre-processing, eigenvector extraction, coarse classification and fine classification, and is finally recognized.

Figure 1:
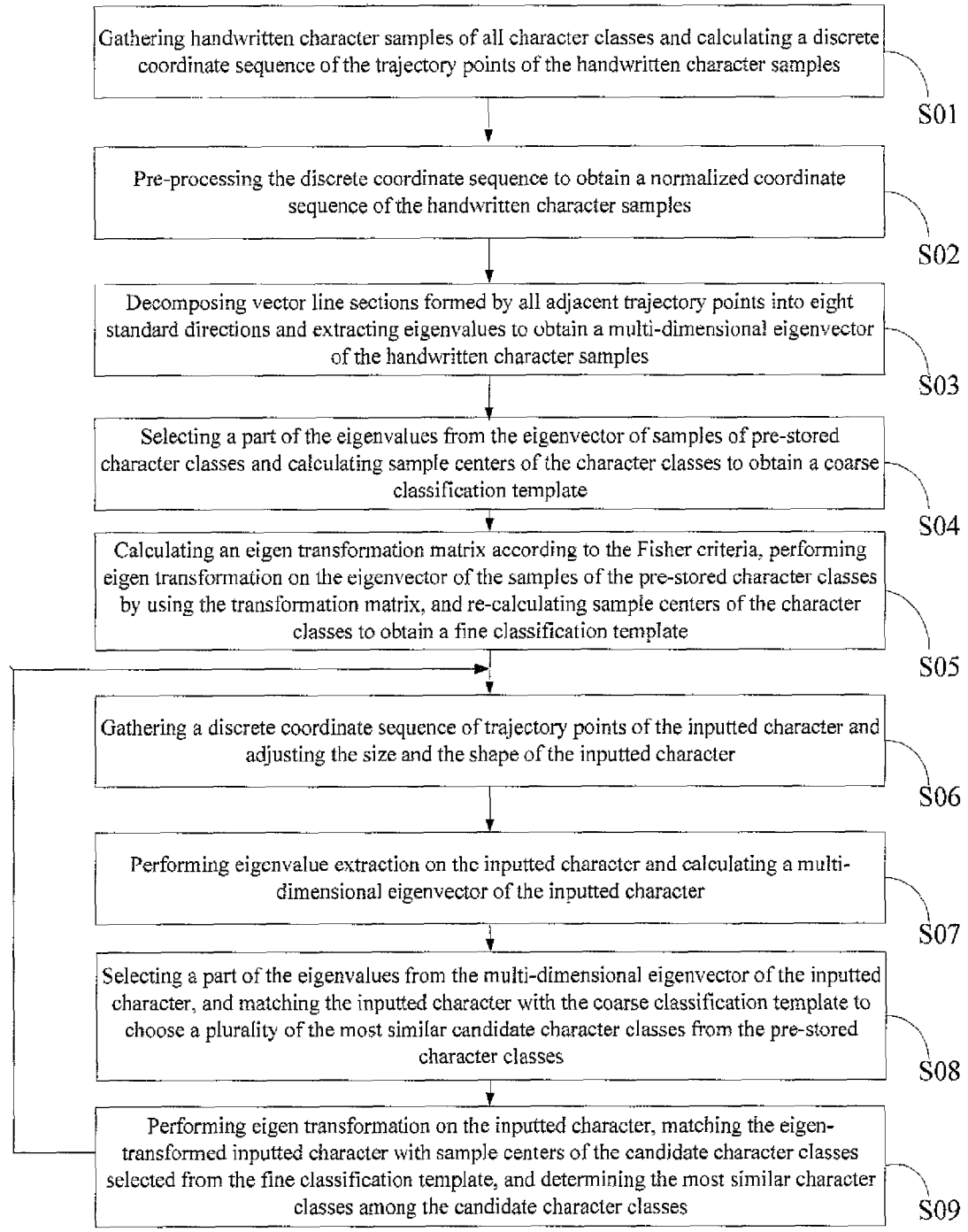
FIG. 1 is a flowchart of a method for recognizing a handwritten character according to an embodiment of the present invention.

FIG. 1 is a flowchart of a method for recognizing a handwritten character according to an embodiment of the present invention. A process for obtaining character matching templates includes the following steps.

Step S01 is executed to gather handwritten character samples of all character classes and calculate a discrete coordinate sequence of the trajectory points of the handwritten character samples. Specifically, a pen is used to write on a touch screen, and a coordinate sequence of a position (x, y) of a pen point is recorded during the writing. A complete writing trajectory of an input character is represented by an (x, y) sequence $\{(x1, y1), (x2, y2), \ldots, (xn, yn)\}$.

Step S02 is executed to transform the discrete coordinate sequence of the trajectory points of the handwritten character samples into another discrete coordinate sequence, and pre-process the discrete coordinate sequence to obtain a normalized coordinate sequence of the handwritten character samples. Specifically, a smooth continuous function is used to transform the discrete coordinate sequence of the gathered trajectory points of the handwritten character into another discrete coordinate sequence so as to adjust the size, the shape and coordinate values of a center of gravity of the handwritten character to obtain the normalized coordinate sequence of the handwritten character. The character trajectory is normalized for two purposes, i.e., size standardization and shape calibration. As shown in FIG. 5*a* to FIG. 5*b*, the character in FIG. 5*a* is normalized into the shape in FIG. 5*b*; and not only the boundary is normalized into a specified size (all characters will have a boundary of the same size after being normalized), but also the shape is changed to be more normalized and easier to recognize.

Normalization is accomplished through two coordinate transformation functions $x'=x^a$ and $y'=y^b$ by substituting coordinates (x, y) of each point in the character trajectory with coordinates (x', y') to obtain a normalized character trajectory.

Parameters a and b are estimated in the following way.

Firstly, minimum values of x and y are found in the coordinate sequence, and the minimum values of x and y are subtracted from the x coordinates and the y coordinates of all the points respectively so that the minimum values of both x and y become 0. Next, all the x values and y values are multiplied with 100/u so that the x values and the y values are between 0 and 100, wherein u is a maximum value of x and y of all the points.

Secondly, projections of the stroke trajectory in a horizontal direction and a vertical direction are obtained. The stroke trajectory of the character is put into a 100×100 grid, as shown in FIG. 6 (a 10×10 grid is shown in the schematic view). Stroke lengths in cells of each column are summed to obtain the projection in the horizontal direction fx(i), i=1, 2, . . . , 100. Similarly, stroke lengths in cells of each row are summed to obtain the projection in the vertical direction fy(i), i=1, 2, . . . , 100. A center of gravity in the horizontal direction is calculated by using fx(i):

$$x_c = \frac{\sum_{i=1}^{100} i \times f_x(i)}{\sum_{i=1}^{100} f_x(i)} \quad (1)$$

Similarly, a center of gravity yc in the vertical direction is calculated by using fy(i).

Thirdly, the coordinate values of all the points and (xc, yc) are divided by 100 to be between 0 and 1. The functions $x'=x^a$ and $y'=y^b$ are used to transform xc and yc into 0.5 respectively; i.e., $x_c^a=0.5$ and $$a = \frac{\log 0.5}{\log x_c},$$

and similarly $y_c^b=0.5$ and $$b = \frac{\log 0.5}{\log y_c}.$$

Through transformation, the center of gravity of the character trajectory is shifted to (0.5, 0.5) while the boundary is not changed.

Fourthly, (x', y') is multiplied with a given multiple so that the outline border of the character is adjusted into a specified size. Suppose that the multiple is 64. Finally, the coordinate values of all the points in the normalized character trajectory are between 0 and 64.

Step S03 is executed to extract eigenvalues according to the normalized coordinate sequence and decompose vector line sections formed by all adjacent trajectory points into eight standard directions to obtain a multi-dimensional eigenvector of the handwritten character samples. This is based on the following basic idea: as shown in FIG. 7, stroke line sections (every two adjacent points are connected to form a vector line section) are decomposed into the eight standard directions D1 to D8; length values of the line sections in the individual directions in each cell of the 64×64 grid are recorded; and then direction eigenvalues of two scales are calculated.

Figure 8:
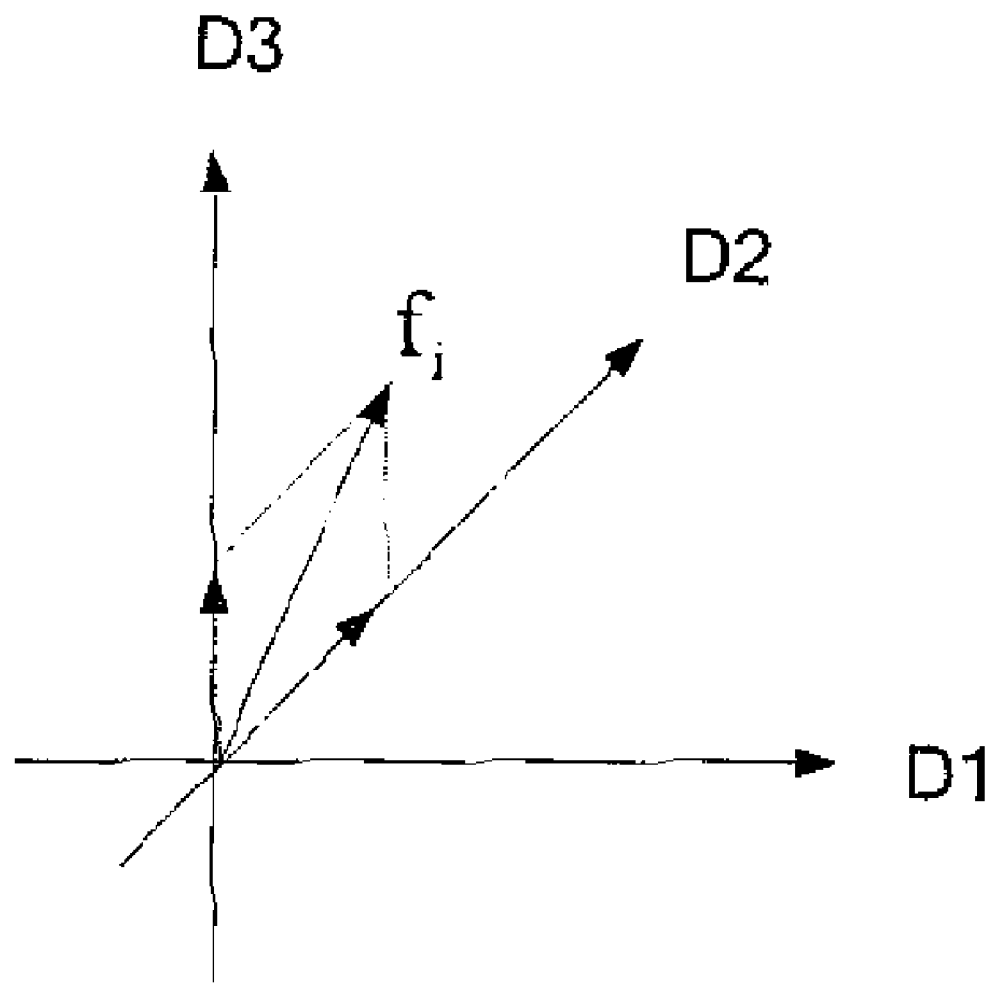
FIG. 8 is a schematic view of a vector line section decomposed into two standard directions described in the step S03 of FIG. 1.

Firstly, the stroke line sections are decomposed into the eight standard directions. Every two adjacent points in the coordinate sequence are connected to form a line section, which is a vector $f_i$ has a direction. The direction of the vector $f_i$ is between the two standard directions D2 and D3. As shown in FIG. 8, the vector $f_i$ is decomposed into components in the two standard directions D2 and D3, and a length value of the component in each of the standard directions is included in the length value of the line section in this direction in the cell. In this way, 64×64 length values of the line sections are obtained in each of the eight directions.

Secondly, large-scale eigenvalues are calculated. The 64×64 grid in each of the directions is uniformly divided into 4×4 squares, and length values of line sections in the directions in each square are summed to obtain 8×4×4=128 eigenvalues.

Thirdly, small-scale eigenvalues are calculated. The 64×64 grid in each of the directions is uniformly divided into 8×8 squares, and length values of line sections in the directions in each square are summed to obtain 8×8×8=512 eigenvalues.

The total number of the large-scale eigenvalues and the small-scale eigenvalues is 128+512=640.

Step S04 is executed to select a part of the eigenvalues from the multi-dimensional eigenvector of the samples of all the character classes and calculate sample centers of the character classes to obtain a coarse classification template composed of the sample centers of all the character classes. Specifically, according to the Fisher criteria, a plurality of eigenvalues that result in the maximum Fisher ratio are selected from the multi-dimensional eigenvector of samples of each of the character classes; and the sample centers of the character classes are calculated to obtain the coarse classification template composed of the sample centers of all the character classes.

The purpose of this step is to obtain the coarse classification template from the eigenvector of samples of the pre-stored character classes; in order to increase the speed of coarse classification, a part of the eigenvalues must be selected to calculate a matching distance; and eigen selection and template design are performed on one training sample set. The training sample set includes the handwritten samples of each of the character classes; and each of the eigen-extracted samples is represented by 640 eigenvalues (a 640-dimensional eigenvector $x=[x_1, \ldots, x_{640}]^T$). Suppose that there are C classes including N samples in total, wherein a class i includes Ni samples. The eigenvalues are selected based on the Fisher criteria (described in detail in a pattern recognition teaching material), the basic idea of which is to construct an evaluation function in such a way that when the evaluation function is optimal, a distance between classes that are classified is as large as possible while a distance between internal samples of each of the classes is as small as possible.

If a $j^{th}$ sample of an $i^{th}$ class is represented as an eigenvector $x_j^i$ (composed of a part of candidate eigenvalues), then each of the sample centers (average values) of the classes is $$\mu^i = \frac{1}{N_i} \sum_{j=1}^{N_i} x_j^i, \quad (2)$$

$$i = 1, \ldots, C$$

and an overall center is $$\mu^0 = \frac{1}{N} \sum_{i=1}^{C} N_i \mu^i.$$

An in-class covariance matrix and a between-class covariance matrix are respectively calculated as:

$$S_w = \frac{1}{N} \sum_{i=1}^{C} \sum_{j=1}^{N_i} (x_j^i - \mu^i)(x_j^i - \mu^i)^T \quad (3)$$

$$S_b = \frac{1}{N} \sum_{i=1}^{C} N_i (\mu^i - \mu^0)(\mu^i - \mu^0)^T \qquad (4)$$

A target of eigen selection is to make a trace $\operatorname{tr}(S_w^{-1} S_b)$ of a matrix $S_w^{-1} S_b$ (the Fisher ratio) have the maximum value on the basis that a part of the eigenvalues are selected. Here, the candidate eigenvalue $x_j^i$ varies in the process of eigen selection. Search of an eigenvalue combination that results in the maximum Fisher ratio is a problem of combinatorial optimization, which can be approximately solved by using a sequential forward search method.

Firstly, a Fisher ratio of each of the eigenvalues is calculated, and an eigenvalue that has the maximum Fisher ratio is selected. Then, each of the rest of the eigenvalues is sequentially combined with the selected eigenvalue to form an eigenvector calculation Fisher ratio, and an eigenvalue that results in the maximum Fisher ratio is selected to be a selected eigenvalue. This is repeated until the number of the selected eigenvalues reaches a specified number (set to be below 100).

Eigen selection is performed in the following process. Firstly, a Fisher ratio of each of 640 eigenvalues as a candidate is calculated sequentially, and an eigenvalue that has the maximum Fisher ratio is selected to be a first eigenvalue. Then, each of the left 639 eigenvalues is sequentially evaluated together with the first eigenvalue (at this point, there are two candidate eigenvalues), and a combination including two eigenvalues that has the maximum Fisher ratio is selected. Then, each of the left 638 eigenvalues is sequentially evaluated together with the selected combination including two eigenvalues (at this point, there are three candidate eigenvalues), and a combination including three eigenvalues that has the maximum Fisher ratio is selected. This is repeated until the number of the selected eigenvalues reaches a specified number. After eigen selection is completed, the eigenvalue set is determined.

After eigen selection, the coarse classification template of the classes is a center (an average value) of samples of a class, which is calculated by using the formula (2).

Step S05 is executed to calculate an eigen transformation matrix according to the Fisher criteria, perform eigen transformation on the multi-dimensional eigenvector of the samples of all the character classes by using the transformation matrix, and re-calculate sample centers of the character classes to obtain a fine classification template composed of the sample centers of all the character classes. In order to obtain an increased recognition precision, the eigenvalues are finely classified by employing eigen transformation instead of eigen selection; i.e., the original D-dimensional eigenvector (D=640) is linearly transformed into a low-dimensionality vector (d<D), and the dimensionality of the eigen-transformed eigenvector is generally set to be between 100 and 150. A formula y=Wx is used to perform eigen transformation, wherein W is a transformation matrix of d×D. The transformation matrix is solved in such a way that the Fisher ratio $\operatorname{tr}[(WS_w W^T)^{-1} W^T S_b W^T]$ has a maximum value; and as a result, each row of W is the maximum d eigenvectors of the matrix $S_w^{-1} S_b$ corresponding to the eigenvalues (this is a standard mathematical method and thus will not be further described herein). After the dimensionality is reduced, the template of the classes is a center of samples of a class (the formula (2)).

The eigen transformation matrix and the class templates obtained in the aforesaid way still cannot have a high recognition precision. Therefore, iterative adjustment is performed on the transformation matrix and the class templates so that classification errors in the training sample set (each sample is classified into a nearest class) are reduced gradually. Firstly, a weight of each training sample is set to be 1; all the training samples are classified by using the transformation matrix and the class center templates obtained according to the Fisher criteria; and the weight of each misclassified sample is added with 1. Supposing that the weight of a sample $x_j^i$ (a $j^{th}$ sample of an $i^{th}$ class) is represented by $v_j^i$, the class centers, the in-class covariance matrix and the between-class covariance matrix are re-calculated according to the following formulas:

$$\mu^i = \frac{1}{\sum_{j=1}^{N_i} v_j^i} \sum_{j=1}^{N_i} v_j^i x_j^i \qquad (5)$$

$$\mu^0 = \frac{1}{\sum_{i=1}^{C} \sum_{j=1}^{N_j} v_j^i} \sum_{i=1}^{C} \sum_{j=1}^{N_i} v_j^i x_j^i \qquad (6)$$

$$S_w = \frac{1}{\sum_{i=1}^{C} \sum_{j=1}^{N_i} v_j^i} \sum_{i=1}^{C} \sum_{j=1}^{N_i} v_j^i (x_j^i - \mu^i)(x_j^i - \mu^i)^T \qquad (7)$$

$$S_b = \frac{1}{\sum_{i=1}^{C} V_i} \sum_{i=1}^{C} V_i (\mu^i - \mu^0)(\mu^i - \mu^0)^T, \qquad (8)$$

where $$V_i = \sum_{j=1}^{N_i} v_j^i$$

On this basis, by maximizing $\operatorname{tr}[(W S_w W^T)^{-1} W^T S_b W^T]$, a transformation matrix and eigen-transformed class centers are re-calculated, the training samples are re-classified, and the weight of each misclassified sample is added with 1. This is repeated until the classification errors of the training samples are not further reduced.

The flow process for recognizing a handwritten input character includes a step S06, a step S07, a step S08 and a step S09.

Step S06 is executed to receive a handwritten character input signal from a user, gather a discrete coordinate sequence of the trajectory points of the inputted character, and pre-process the discrete coordinate sequence to obtain a normalized coordinate sequence of the character.

The processing process of this step is similar to that of the step S01 and the step S02. Firstly, a pen is used to write on a touch screen, and a coordinate sequence of a position (x, y) of a pen point is recorded during the writing. A complete writing trajectory of an input character is represented by an (x, y) sequence $\{(x1, y1), (x2, y2), \ldots, (xn, yn)\}$.

Then, a smooth continuous function is used to transform the discrete coordinate sequence of the gathered trajectory points of the handwritten character into another discrete coordinate sequence so as to adjust the size, the shape and coordinate values of a center of gravity of the handwritten character to obtain the normalized coordinate sequence of the handwritten character. The character trajectory is normalized for two purposes, i.e., size standardization and shape calibration. As shown in FIG. 5a to FIG. 5b, the character in FIG. 5a is normalized into the shape in FIG. 5b; and not only the boundary is normalized into a specified size (all characters will have a boundary of the same size after being normalized), but also the shape is changed to be more normalized and easier to recognize. Normalization is accomplished through two coordinate transformation functions $x'=x^a$ and $y'=y^b$ by substituting coordinates (x, y) of each point in the character trajectory with coordinates (x', y') to obtain a normalized character trajectory. Parameters a and b are estimated in the same way as that described in the step S02.

Step S07 is executed to extract eigenvalues according to the normalized coordinate sequence and calculate a multi-dimensional eigenvector of the handwritten input character. The process of extracting the eigenvalues is the same as that described in the step S03. As shown in FIG. 7, stroke line sections (every two adjacent points are connected to form a vector line section) are decomposed into the eight standard directions D1 to D8; length values of the line sections in the individual directions in each cell of the 64×64 grid are recorded; and then direction eigenvalues of two scales are calculated.

Firstly, the stroke line sections are decomposed into the eight standard directions. Every two adjacent points in the coordinate sequence are connected to form a line section, which is a vector $f_i$ has a direction. The direction of the vector $f_i$ is between the two standard directions D2 and D3. As shown in FIG. 8, the vector $f_i$ is decomposed into components in the two standard directions D2 and D3, and a length value of the component in each of the standard directions is included in the length value of the line section in this direction in the cell. In this way, 64×64 length values of the line sections are obtained in each of the eight directions.

Secondly, large-scale eigenvalues are calculated. The 64×64 grid in each of the directions is uniformly divided into 4×4 squares, and length values of line sections in the directions in each square are summed to obtain 8×4×4=128 eigenvalues.

Thirdly, small-scale eigenvalues are calculated. The 64×64 grid in each of the directions is uniformly divided into 8×8 squares, and length values of line sections in the directions in each square are summed to obtain 8×8×8=512 eigenvalues.

The total number of the large-scale eigenvalues and the small-scale eigenvalues is 128+512=640.

Step S08 is executed to select a part of the eigenvalues from the multi-dimensional eigenvector of the handwriting input character, match the handwritten input character with the coarse classification template to select a plurality of the most similar sample centers from the coarse classification template, and use character classes corresponding to the plurality of sample centers as candidate character classes. According to the Fisher criteria, a plurality of eigenvalues that result in the maximum Fisher ratio are selected from the multi-dimensional eigenvector of the handwriting input character, and the number of the selected eigenvalues is the same as that in the step S04.

A matching distance of the template is calculated as follows: supposing that the multi-dimensional eigenvector of the handwriting input character is represented by a vector $x=[x_1, \ldots, x_n]^T$ and a sample center of a class in the coarse classification template is represented as an eigenvector $y=[y_1, \ldots, y_n]^T$, then the matching distance is calculated according to the following formula:

$$d(x, y) = \sum_{i=1}^{n} |x_i - y_i| \qquad (9)$$

Step S09 is executed to use the eigen transformation matrix calculated according to the Fisher criteria in the step S05 to perform eigen transformation on the multi-dimensional eigenvector of the handwritten input character, select sample centers of the candidate character classes from the fine classification template for matching with the eigen-transformed handwritten input character respectively, and determine the most similar character classes among the candidate character classes for the user to select. Then, return to the step S06 to recognize a next handwritten input character.

The purpose of this step is to perform fine classification. For an input character, after M candidate classes are found through the coarse classification in the step S08, the fine classification is performed using more eigenvalues than the coarse classification; and distances between the input character and the M candidate classes are re-calculated according to the formula (9), and a class that results in the minimum distance is selected as a final recognition result.

The fine classification provides a plurality of (usually, 10) classes that result in the minimum matching distance as final candidate classes. These candidate classes may be directly displayed for the user to select, or may be automatically selected according to contexts by using the language rule.

The coarse classification in the step S08 is performed to compare (match) the eigenvector of the input character (the character to be recognized) with the template of the character classes stored in a template database to search M (e.g., M=10) classes that result in the minimum distance (i.e., have the greatest similarity) as candidate classes; and during the fine classification in the step S09, a class candidate that results in the minimum distance is found as the final recognition result.

The templates (and also the eigenvalues) compared during the coarse classification and the fine classification are different in that: the coarse classification template is simple (the number of the eigenvalues is small) and the calculation rate is fast while the fine classification template is complicated (the number of the eigenvaules is large) and the calculation rate is slow).

The coarse classification is performed in order to quickly search M candidate classes, so in the fine classification, it only needs to calculate distances of the M candidate classes instead of calculating distances of all the classes so as to increase the overall recognizing speed.

Figure 2:
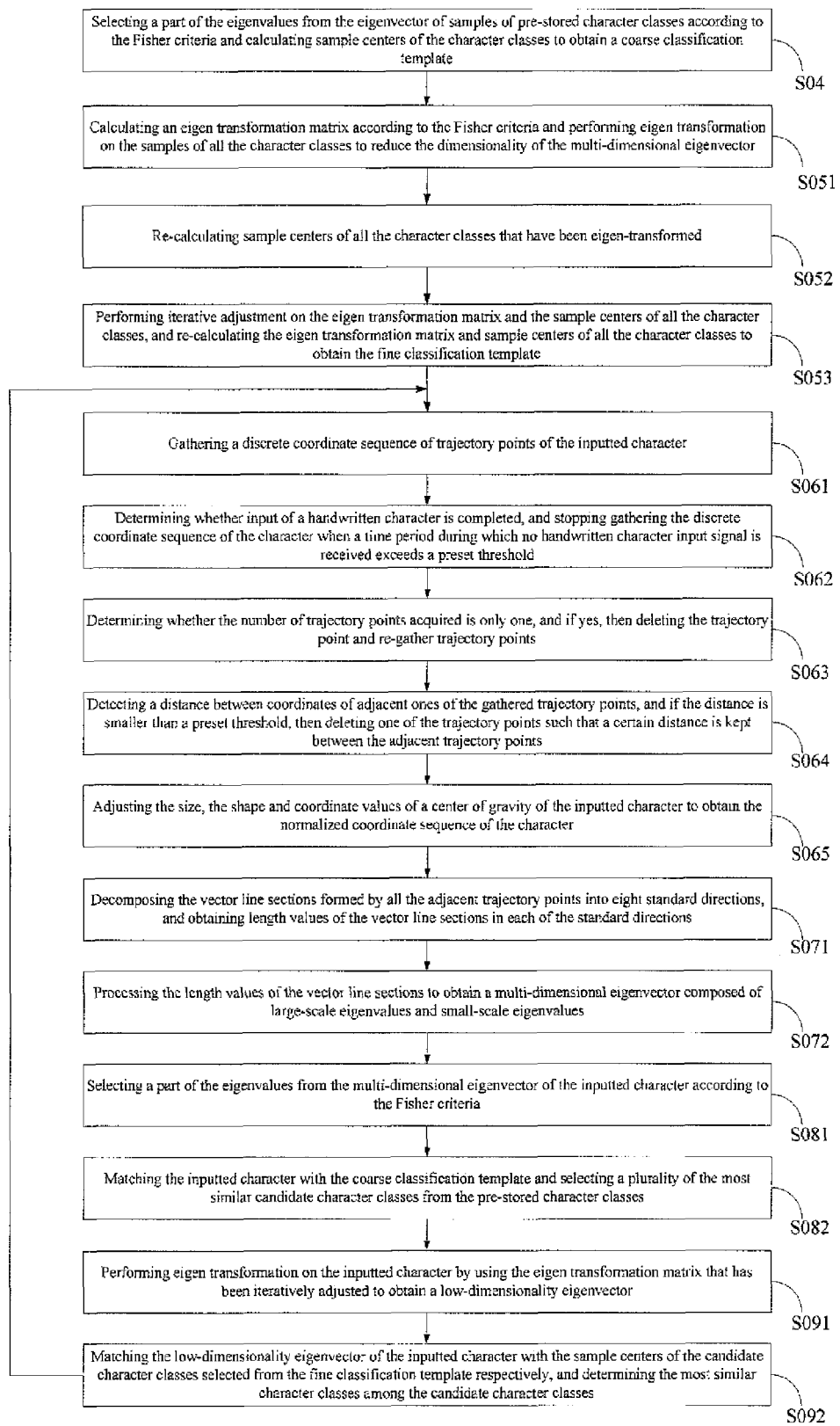
FIG. 2 is a detailed flowchart of the method for recognizing a handwritten character according to the embodiment of the present invention.

Accordingly, FIG. 2 is a detailed flowchart of the method for recognizing a handwritten character according to the embodiment of the present invention.

The step S05 includes the following sub-steps.

Sub-step S051 is executed to perform eigen transformation on the samples of all the character classes by using the eigen transformation matrix obtained according to the Fisher criteria to reduce the dimensionality of the multi-dimensional eigenvector.

Sub-step S052 is executed to re-calculate sample centers of all the character classes that have been eigen-transformed.

Sub-step S053 is executed to perform iterative adjustment on the eigen transformation matrix and the sample centers of all the character classes, and re-calculate the eigen transformation matrix and sample centers of all the character classes to obtain the fine classification template composed of the sample centers of all the character classes.

The step S06 includes the following sub-steps.

Sub-step S061 is executed to receive a handwritten character input signal and gather a discrete coordinate sequence of the trajectory points of the inputted character.

Sub-step S062 is executed to determine whether input of a character is completed, and stop gathering the discrete coordinate sequence of the character when a time period during which no handwritten character input signal is received exceeds a preset threshold. Specifically, when a time period during which the pen is lifted exceeds a preset threshold (e.g., 0.5 second), it will be considered that writing of a character is completed. A complete writing trajectory of an input character is represented by an (x, y) sequence {(x1, y1), (x2, y2), ..., (xn, yn)}, and lifting of the pen is represented by special coordinates (−1, 0).

Sub-step S063 is executed to determine whether the number of trajectory points of the handwritten character gathered is only one, and if yes, then delete the trajectory point and re-gather trajectory points.

Sub-step S064 is executed to detect a distance between coordinates of adjacent ones of the gathered trajectory points of the handwritten character, and if the distance is smaller than a preset threshold (i.e., if positions of two adjacent trajectory points coincide or are very close to each other), then delete one of the trajectory points such that a certain distance is kept between the adjacent trajectory points.

Sub-step S065 is executed to transform the discrete coordinate sequence of the gathered trajectory points of the handwritten character into another discrete coordinate sequence by using a smooth continuous function so as to adjust the size, the shape and coordinate values of a center of gravity of the handwritten input character to obtain the normalized coordinate sequence of the character.

The step S07 includes the following sub-steps.

Sub-step S071 is executed to, according to the normalized coordinate sequence of the handwritten character, decompose the vector line sections formed by all the adjacent trajectory points into eight standard directions (as shown in FIG. 7 and FIG. 8), and obtain length values of the vector line sections in each of the standard directions.

Sub-step S072 is executed to process the obtained length values of the vector line sections to obtain a multi-dimensional eigenvector composed of large-scale eigenvalues and small-scale eigenvalues.

The step S08 includes the following sub-steps.

Sub-step S081 is executed to select a part of the eigenvalues from the multi-dimensional eigenvector of the handwritten input character according to the Fisher criteria, wherein the handwritten input character has an eigenvector composed of the selected eigenvalues and having the same dimensionality as the samples of the character classes.

Sub-step S082 is executed to match the handwritten input character with the coarse classification template and select a plurality of the most similar candidate character classes from the pre-stored character classes.

The step S09 includes the following sub-steps.

Sub-step S091 is executed to perform eigen transformation on the handwritten input character by using the eigen transformation matrix that has been iteratively adjusted to obtain a low-dimensionality eigenvector.

Sub-step S092 is executed to match the low-dimensionality eigenvector of the handwritten input character with the sample centers of the candidate character classes selected from the fine classification template respectively, and determine the most similar character classes among the candidate character classes for the user to select.

Figure 3:
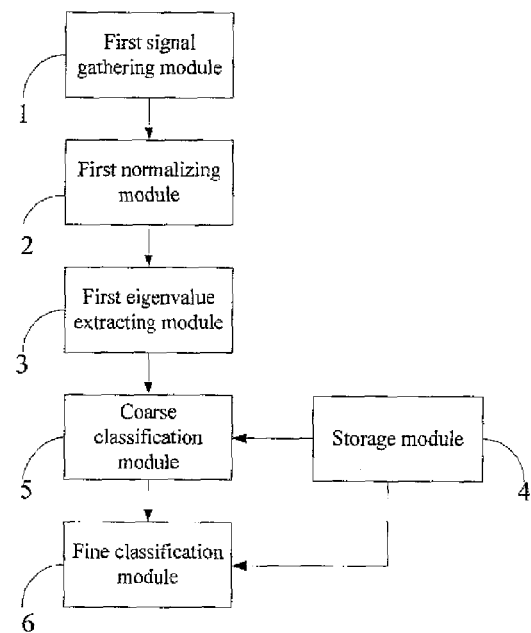
FIG. 3 is a schematic view illustrating a structure of a system for recognizing a handwritten character according to the embodiment of the present invention.

FIG. 3 is a schematic view illustrating a structure of a system for recognizing a handwritten character according to the embodiment of the present invention. The system includes:

a first signal gathering module 1, being configured to receive a handwritten character input signal and gather a discrete coordinate sequence of trajectory points of the handwritten character;

a first normalizing module 2, being configured to transform the gathered discrete coordinate sequence of the trajectory points of the handwritten character into another discrete coordinate sequence by using a smooth continuous function so as to adjust the size, the shape and coordinate values of a center of gravity of the handwritten character to obtain a normalized coordinate sequence of the handwritten character;

a first eigenvalue extracting module 3, being configured to, according to the normalized coordinate sequence of the handwritten character, decompose vector line sections formed by all adjacent trajectory points into eight standard directions to obtain a multi-dimensional eigenvector of the handwritten character;

a storage module 4, being configured to store character classes, a coarse classification template and a fine classification template corresponding to the character classes, and an eigen transformation matrix calculated according to the Fisher criteria;

a coarse classification module 5, being configured to select a part of eigenvalues from the multi-dimensional eigenvector of the handwriting input character, and match the handwritten input character with the coarse classification template in the storage module 4 to select a plurality of the most similar candidate character classes from pre-stored character classes; and a fine classification module 6, being configured to perform eigen transformation on the multi-dimensional eigenvector of the handwritten input character, match the eigen-transformed handwritten input character with sample centers of the candidate character classes selected from the fine classification template in the storage module 4, and determine the most similar character classes among the candidate character classes for the user to select.

Figure 4:
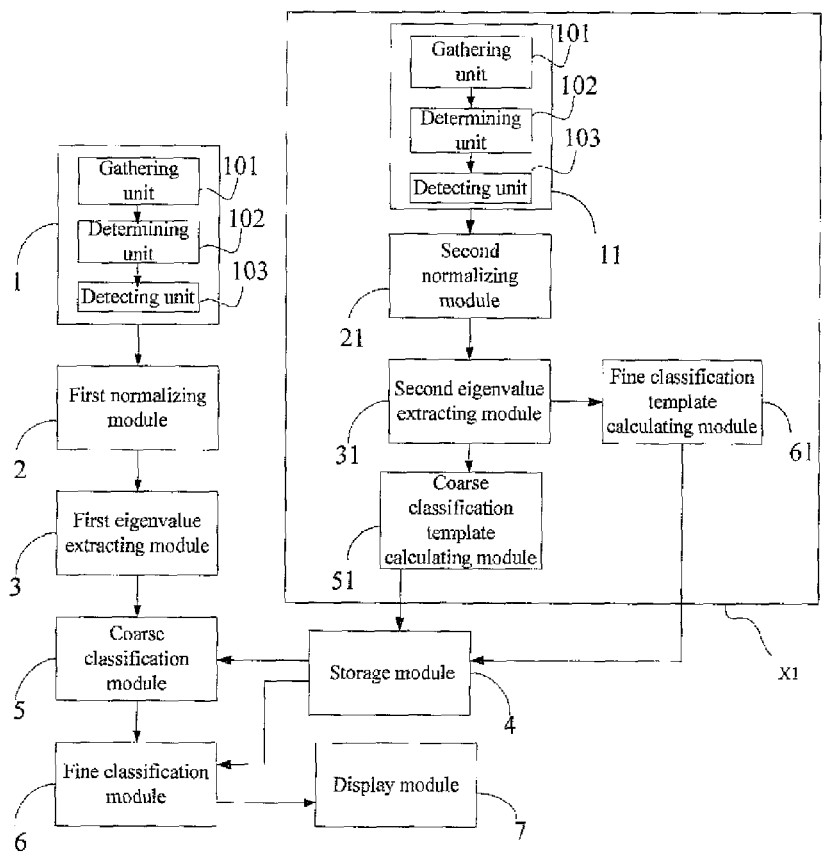
FIG. 4 is a detailed schematic view illustrating a structure of the system for recognizing a handwritten character according to the embodiment of the present invention.

FIG. 4 is a detailed schematic view illustrating a structure of the system for recognizing a handwritten character according to the embodiment of the present invention. The system further includes a matching template gathering sub-system X1, which includes:

a second signal gathering module 11, being configured to receive a handwritten character sample signal and gather a discrete coordinate sequence of trajectory points of the handwritten character;

a second normalizing module 21, being configured to transform the discrete coordinate sequence of the trajectory points of the handwritten character that is gathered by the second signal gathering module 11 into another discrete coordinate sequence so as to adjust the size, the shape and coordinate values of a center of gravity of the handwritten character to obtain a normalized coordinate sequence of the character;

a second eigenvalue extracting module 31, being configured to, according to the normalized coordinate sequence, decompose vector line sections formed by all adjacent trajectory points of the handwritten character into eight standard directions to calculate a multi-dimensional eigenvector of the handwritten character;

a coarse classification template calculating module 51, being configured to select a part of eigenvalues from the multi-dimensional eigenvector of the samples of all the character classes that is obtained by the eigenvalue extracting module, calculate sample centers of the character classes to obtain the coarse classification template composed of the sample centers of all the character classes, and store the coarse classification template into the storage module 4; and a fine classification template calculating module 61, being configured to calculate the eigen transformation matrix according to the Fisher criteria, perform eigen transformation on the multi-dimensional eigenvector of the samples of all the character classes by using the eigen transformation matrix, re-calculate sample centers of the character classes to obtain the fine classification template composed of the sample centers of all the character classes, and store the fine classification template and the eigen transformation matrix into the storage module 4.

The first signal gathering module 1 and the second signal gathering module 11 include:

an gathering unit 101, being configured to gather a discrete coordinate sequence of trajectory points of the handwritten character;

a determining unit 102, being configured to determine whether input of a handwritten character is completed, and stop gathering the discrete coordinate sequence of the handwritten character when a time period during which no handwritten character input signal is received exceeds a preset threshold; and a detecting unit 103, being configured to determine whether the number of trajectory points of the handwritten character gathered is only one, and if yes, delete the trajectory point and re-gather trajectory points; and detect a distance between coordinates of adjacent ones of the gathered trajectory points of the handwritten character, and if the distance is smaller than a preset threshold, delete one of the trajectory points such that a certain distance is kept between the adjacent trajectory points.

The system further includes a display module 7 configured to display the most similar character classes outputted by the fine classification module 6 for the user to select.

The present invention differs from the prior art method in such techniques as normalization, eigenvalue extraction, coarse classification and fine classification.

Normalization: the coordinate transformation functions $x'=x^a$ and $y'=y^b$ are newly proposed, and this has the benefit that the coordinate transformation functions are smooth continuous functions so that the transformed character has a more natural shape while ensuring that the center of gravity of the character trajectory is shifted to a center (0.5) of the outline border. Although there are practices of mapping a center of gravity of a character to the center of the outline border in the prior art, what used is a piecewise linear function and the transformed character has an unnatural shape, which unfavorably affects the subsequent recognizing process.

Eigenvalue extraction: line sections of the stroke trajectory are directly decomposed into eight directions. In the prior art method, the trajectory is firstly changed into an image, and directional decomposition is performed on pixels in the image; however, this results in more calculations, and the generated image may be distorted. The method of the present invention avoids the additional calculations caused by generation of the image, and direction eigenvalues obtained are more accurate.

Coarse classification: usually, a part of eigenvalues are manually selected (e.g., large-scale eigenvalues are used directly) or eigen transformation is employed in the prior art method. However, in the method of the present invention, the eigenvalues selected according to the Fisher criteria have a high recognition precision than those selected manually, and the calculations are reduced compared with the case in which eigen transformation is employed (this is because there is no linear transformation).

Fine classification: iterative adjustment performed on the eigen transformation matrix and the class center templates can significantly increase the recognition precision. In the conventional method, the transformation matrix is obtained directly according to the Fisher criteria, and then the class center templates are adjusted based on the transformed eigenvalues by using a learning vector quantization (LVQ) algorithm. In the method of the present invention, a high recognition precision can be achieved by adjusting both the transformation matrix and the class center templates.

The method of the present invention is suitable for recognition of Chinese, English, numerals and symbols.

I. A trajectory of an input Chinese character is: 唉

II. A trajectory of the normalized Chinese character is: 唉

III. Ten candidate classes selected through the coarse classification and matching distances thereof (the distances are calculated based on 60 selected eigenvalues)

| 唆 | 唉 | 哈 | 咬 | 唤 | 吠 | 嗖 | 喉 | 喉 | 哎 |
|---|---|---|---|---|---|---|---|---|---|
| 597 | 621 | 643 | 676 | 689 | 698 | 715 | 732 | 764 | 771 |

IV. The ten candidate classes re-ordered through the fine classification and distances thereof (the distances are calculated based on 120 transformed eigenvalues)

| 唉 | 咬 | 唤 | 唆 | 哈 | 唉 | 吠 | 喉 | 嗖 | 哎 |
|---|---|---|---|---|---|---|---|---|---|
| 1079 | 1121 | 1157 | 1186 | 1233 | 1298 | 1374 | 1419 | 1462 | 1503 |

V. The final recognition result is "唉".

What described above are only preferred embodiments of the present invention, and of course, are not intended to limit the scope of the present invention. It shall be appreciated that, many improvements and alterations can be readily made by those of ordinary skill in the art without departing from the principle of the present invention; and all these improvements and alterations shall be also covered within the protection scope of the present invention.

The invention claimed is:

1. A method for recognizing a handwritten character, comprising the following steps of
    A. creating a coarse classification template composed of first sample centers of character classes and a fine classification template composed of second sample centers of the character classes, wherein the fine classification template is obtained by using an eigen transformation matrix to perform eigen transformation on samples of the character classes;
    B. receiving a handwritten character input signal from a user and gathering a discrete coordinate sequence of trajectory points of an inputted character corresponding to the handwritten character input signal, and pre-processing the discrete coordinate sequence to obtain a normalized coordinate sequence of the inputted character;
    C. extracting eigenvalues according to the normalized coordinate sequence and decomposing vector line sections formed by all adjacent trajectory points into eight standard directions to calculate a multi-dimensional eigenvector of the inputted character;
    D. selecting a part of the eigenvalues from the multi-dimensional eigenvector of the inputted character, matching the inputted character with the coarse classification template to select a plurality of the most similar sample centers from the coarse classification template, and using character classes corresponding to the plurality of sample centers as candidate character classes; and
    E. using the eigen transformation matrix in the step A to perform eigen transformation on the multi-dimensional eigenvector of the inputted character, selecting sample centers of the candidate character classes obtained in the step D from the fine classification template for matching with the eigen-transformed inputted character respectively, and determining the most similar character classes among the candidate character classes for the user to select.

2. The method for recognizing a handwritten character of claim 1, wherein the step A comprises the following sub-steps of:

A1. gathering handwritten character samples of the character classes, and calculating a discrete coordinate sequence of the trajectory points of the handwritten character samples;

A2. pre-processing the discrete coordinate sequence of the trajectory points of the handwritten character samples to obtain a normalized coordinate sequence of the handwritten character samples;

A3. extracting eigenvalues according to the normalized coordinate sequence and decomposing vector line sections formed by all adjacent trajectory points into eight standard directions to obtain a multi-dimensional eigenvector of the handwritten character samples;

A4. selecting a part of the eigenvalues from the multi-dimensional eigenvector of the samples of all the character classes and calculating first sample centers of the character classes to obtain a coarse classification template composed of the first sample centers of the character classes; and A5. calculating an eigen transformation matrix according to the Fisher criteria, performing eigen transformation on the multi-dimensional eigenvector of the samples of all the character classes by using the eigen transformation matrix, and re-calculating second sample centers of the character classes to obtain a fine classification template composed of the second sample centers of the character classes.

3. The method for recognizing a handwritten character of claim 2, wherein the sub-step A3 and the step C comprise the following sub-steps of:

according to the normalized coordinate sequence, decomposing the vector line sections formed by all the adjacent trajectory points into eight standard directions, and obtaining length values of the vector line sections in each of the standard directions; and processing the obtained length values of the vector line sections, and calculating large-scale eigenvalues and small-scale eigenvalues to obtain a multi-dimensional eigenvector composed of the large-scale eigenvalues and the small-scale eigenvalues.

4. The method for recognizing a handwritten character of claim 2, wherein the sub-step A4 comprises the following sub-steps of:

according to the Fisher criteria, selecting a plurality of eigenvalues that can result in the maximum Fisher ratio from samples of each of the pre-stored character classes; and according to the eigenvector of the samples composed of the selected eigenvalues, calculating eigenvectors of the sample centers of the character classes to obtain the coarse classification template composed of the sample centers of all the character classes.

5. The method for recognizing a handwritten character of claim 2, wherein the sub-step A5 comprises the following sub-steps of:

performing eigen transformation on the samples of all the character classes by using the eigen transformation matrix obtained according to the Fisher criteria to reduce the dimensionality of the multi-dimensional eigenvector;

re-calculating sample centers of all the character classes that have been eigen-transformed; and performing iterative adjustment on the eigen transformation matrix and the sample centers of all the character classes, and re-calculating the eigen transformation matrix and sample centers of all the character classes to obtain the fine classification template composed of the sample centers of all the character classes.

6. The method for recognizing a handwritten character of claim 2, wherein the sub-step A1 and the step B comprise the following sub-steps of:

determining whether input of a handwritten character is completed, and stopping gathering the discrete coordinate sequence of the character when a time period during which no handwritten character input signal is received exceeds a preset threshold;

determining whether the number of trajectory points of the handwritten character gathered is only one, and if yes, then deleting the trajectory point and re-gathering trajectory points; and detecting a distance between coordinates of adjacent ones of the gathered trajectory points of the handwritten character, and if the distance is smaller than a preset threshold, then deleting one of the trajectory points such that a certain distance is kept between the adjacent trajectory points.

7. The method for recognizing a handwritten character of claim 2, wherein the pre-processing in the sub-step A2 and the step B is to transform the gathered discrete coordinate sequence of the trajectory points of the handwritten character into another discrete coordinate sequence so as to adjust the size, the shape and coordinate values of a center of gravity of the inputted character, comprising the following sub-steps of:

transforming abscissa values and ordinate values of all the trajectory points to be between 0 and 100;

calculating coordinate values of centers of gravity of the abscissa values and the ordinate values of all the trajectory points respectively;

dividing all the coordinate values of the trajectory points and the coordinates values of the centers of gravity by 100 such that all the coordinate values of the trajectory points and the coordinate values of the centers of gravity are between 0 and 1, and transforming the gathered discrete coordinate sequence of the trajectory points of the handwritten character into another discrete coordinate sequence by using a smooth continuous function that transforms abscissa values and ordinate values of the centers of gravity into 0.5; and multiplying all the coordinate values of the trajectory points by 64 to obtain a normalized coordinate sequence of the inputted character.

8. The method for recognizing a handwritten character of claim 1, wherein the step D comprises the following sub-steps of:

selecting a part of eigenvalues from the multi-dimensional eigenvector of the inputted character according to the Fisher criteria, wherein the inputted character has an eigenvector composed of the selected eigenvalues and having the same dimensionality as the samples of the character classes; and matching the inputted character with the coarse classification template and selecting a plurality of candidate character classes having the greatest similarity from the pre-stored character classes.

9. The method for recognizing a handwritten character of claim 8, wherein the step E comprises the following sub-steps of:

performing eigen transformation on the inputted character by using the eigen transformation matrix that has been iteratively adjusted to obtain a low-dimensionality eigenvector; and matching the low-dimensionality eigenvector of the inputted character with the sample centers of the candidate character classes selected from the fine classification template respectively, and determining the most similar character classes among the candidate character classes for the user to select.

10. A system for recognizing a handwritten character, comprising:

a storage module, being configured to store character classes, a coarse classification template and a fine classification template corresponding to the character classes, and an eigen transformation matrix calculated according to the Fisher criteria;

a first signal gathering module, being configured to receive a handwritten character input signal from a user and gather a discrete coordinate sequence of trajectory points of the handwritten character;

a first normalizing module, being configured to transform the discrete coordinate sequence of the trajectory points of the handwritten character that is gathered by the first signal gathering module into another discrete coordinate sequence so as to adjust the size, the shape and coordinate values of a center of gravity of the handwritten character to obtain a normalized coordinate sequence of the character;

a first eigenvalue extracting module, being configured to, according to the normalized coordinate sequence, decompose vector line sections formed by all adjacent trajectory points of the handwritten character into eight standard directions to calculate a multi-dimensional eigenvector of the handwritten character;

a coarse classification module, being configured to select a part of eigenvalues from the multi-dimensional eigenvector of the handwriting character inputted by the user, match the handwritten input character with the coarse classification template in the storage module respectively to select a plurality of the most similar sample centers from the coarse classification template, and use character classes corresponding to the plurality of sample centers as candidate character classes;

a fine classification module, being configured to perform eigen transformation on the multi-dimensional eigenvector of the inputted character, select sample centers of the candidate character classes from the fine classification template for matching with the eigen-transformed inputted character respectively, and determine the most similar character classes among the candidate character classes for the user to select; and a display module, being configured to display the most similar character classes outputted by the fine classification module for the user to select.

11. The system for recognizing a handwritten character of claim 10, further comprising a matching template gathering sub-system, which comprises:

a second signal gathering module, being configured to receive a handwritten character sample signal and gather a discrete coordinate sequence of trajectory points of the handwritten character;

a second normalizing module, being configured to transform the discrete coordinate sequence of the trajectory points of the handwritten character that is gathered by the second signal gathering module into another discrete coordinate sequence so as to adjust the size, the shape and coordinate values of a center of gravity of the handwritten character to obtain a normalized coordinate sequence of the character;

a second eigenvalue extracting module, being configured to, according to the normalized coordinate sequence, decompose vector line sections formed by all adjacent trajectory points of the handwritten character into eight standard directions to calculate a multi-dimensional eigenvector of the handwritten character;

a coarse classification template calculating module, being configured to select a part of eigenvalues from the multi-dimensional eigenvector of the samples of all the character classes that is obtained by the eigenvalue extracting module, calculate sample centers of the character classes to obtain the coarse classification template composed of the sample centers of all the character classes, and store the coarse classification template into the storage module; and a fine classification template calculating module, being configured to calculate the eigen transformation matrix according to the Fisher criteria, perform eigen transformation on the multi-dimensional eigenvector of the samples of all the character classes by using the eigen transformation matrix, re-calculate sample centers of the character classes to obtain the fine classification template composed of the sample centers of all the character classes, and store the fine classification template and the eigen transformation matrix into the storage module.

12. The system for recognizing a handwritten character of claim 11, wherein the first signal gathering module and the second signal gathering module further comprise:

an gathering unit, being configured to receive a handwritten character signal and gather a discrete coordinate sequence of trajectory points of the handwritten character;

a determining unit, being configured to determine whether input of a handwritten character is completed, and stop gathering the discrete coordinate sequence of the character when a time period during which no handwritten character input signal is received exceeds a preset threshold; and a detecting unit, being configured to determine whether the number of trajectory points of the handwritten character gathered is only one, and if yes, delete the trajectory point and re-gather trajectory points; and detect a distance between coordinates of adjacent ones of the gathered trajectory points of the handwritten character, and if the distance is smaller than a preset threshold, delete one of the trajectory points such that a certain distance is kept between the adjacent trajectory points.

* * * * *